3,813,346
METHOD FOR EXPANDING MICA-GROUP MINERALS WITH HYDROGEN PEROXIDE PLUS AN ACID

Takeo Wada and Saburo Komai, Osaka, Japan, assignors to Takeda Chemical Industries, Ltd., Osaka, Japan
No Drawing. Filed Aug. 3, 1972, Ser. No. 277,509
Claims priority, application Japan, Aug. 12, 1971, 46/61,244
Int. Cl. C04b 31/22, 31/36, 2/02
U.S. Cl. 252—378 R        10 Claims

ABSTRACT OF THE DISCLOSURE

The present invention relates to a method for expanding a mica mineral which comprises treating a mica mineral in the presence of hydrogen peroxide and an acid. A high degree of expansion is realized.

---

This invention relates to a method for expanding mica-group minerals. More concretely to say, the present invention relates to a method for expanding a mica-group mineral, which comprises subjecting a mica-group mineral to the action of hydrogen peroxide in the presence of an acid.

The mica-group mineral, when they are so referred to in the specification and claims, means a highly laminar phylosilicate, and the mica-group mineral includes vermiculite, hydrobiotite, muscovite, paragonite, phlogopite, biotite, lepidolite, glauconite, chlorite, apophyllite or the like.

It has hitherto been well known that vermiculite and hydrobiotite have the property of expanding when rapidly heated to a temperature above 800° C., and that thus expanded minerals are light in weight, heat-insulating and acoustic. Therefore, those minerals have in recent years attracted a great deal of attention as candidates for industrial materials and, actually, have been used in many applications, for example as architectural materials, lagging materials and insulation materials, packing materials and the like.

The present inventors have conducted an extensive exploratory study to develop a method for expanding mica-group minerals at low temperatures with the aid of hydrogen peroxide, and they have unexpectedly found that if a mica-group mineral is treated with hydrogen peroxide in the presence of an acid, the degree of expansion is at least about twice that attainable when the same mineral is merely treated with hydrogen peroxide.

The present inventors have also found that the mica-group mineral so expanded with hydrogen peroxide in the presence of an acid is as light-weight, sound-absorbent, heat-insulating and decorative as vermiculite or hydrobiotite which has been expanded by rapid heating at a high temperature above 800° C.

The present inventors have also surprisingly found that the mica-group mineral expanded by the treatment with hydrogen peroxide in the presence of an acid possesses some additional desired properties which are not found in the vermiculite or hydrobiotite expanded by rapid heating. such as ion-exchangeability, humidity-control, high water retention, de-ammoniacal odor properties. These and further research findings have culminated in the method which is herein described and claimed.

The method according to this invention comprises treating a mica-group mineral with hydrogen peroxide in the presence of an acid. The treatment is carried out by bringing the mica-group mineral into contact with hydrogen peroxide in the presence of an acid. The contact of a mica-group mineral with hydrogen peroxide in the presence of an acid is usually carried out by mixing the three materials, i.e. a mica-group mineral, an acid and hydrogen peroxide. The three materials may be mixed in any order. Therefore, one may previously add an acid to a mica-group mineral and then add hydrogen peroxide to the mixture; one may add a mixture of an acid and hydrogen peroxide to a mica-group mineral; one may add an acid and hydrogen peroxide separately and simultaneously to a micagroup mineral; or one may add an acid to a mixture of hydrogen peroxide and a mica-group mineral. In any instances, it is advantageous that those three materials are sufficiently admixed. The mica-group mineral in the resulting mixture is effectively expanded by the action of hydrogen peroxide in the presence of an acid. While the expansion reaction, the reaction system may be kept under stirring until the expansion of the mica-group mineral is completed.

The acid mentioned above may be either a mineral acid or an organic acid. Typical mineral acids include sulfuric acid, phosphoric acid, hydrochloric acid, nitric acid, perchloric acid, chromic acid, silicic acid, etc. The organic acids includes aliphatic carboxyl acids such as naphthenic acid, tartaric acid, oxalic acid, acetic acid, fumaric acid, maleic acid, olec acid, lauric acid, monochloroacetic acid, myristic acid, malic acid, citric acid, stearic acid, capric acid, palmitic acid, lactic acid, gluconic acid, acrylic acid, etc.; aromatic carboxylic acids such as benzoic acid, O-methoxybenzoic acid, anthranylic acid, salicylic acid, etc.; organic sulfonic acids such as benzene-sulfonic acid; uric acid; and the like. Of course, these acids may be employed either alone or as a mixture.

In the method of this invention, hydrogen peroxide is usually introduced into the reaction system together with water as a carrier or vehicle, that is to say, hydrogen peroxide is usually employed in the form of an aqueous solution. Therefore, one may advantageously employ, in place of an acid as such, any substance that will liberate an acid upon contact with water. Thus, for example, the anhydrides of the acids enumerated above, such as maleic anhydride and acetic anhydride, $Cl_2$, $SO_2$, $SO_3$ or the like may also be employed to advantage.

The amount of acid depends upon its concentration and other factors, but generally one may employ about 0.01 to 1.0 mole of acid relative to hundred grams of mica-group minerals.

These acids may be used as such, but for the purpose of assisting in admixture, one may previously dilute them with a suitable solvent. The solvent may preferably be a hydrophilic solvent such as water, an alcohol (e.g. methanol, ethanol, n-propanol, glycerin, ethylene glycol, etc.), acetone, dimethylformamide or the like. The solvent is desirably water for mineral acids and water or alcohol for organic acids. Generally speaking, it is advantageous for the reaction of the mica-group mineral and hydrogen peroxide in the presence of an acid that the concentration of an acid is 0.5 N or higher, more preferably, 6 N or higher.

The mica-group minerals may be those which have just been mined or the minerals which have been previously processed in conventional manners, for example, those which have been ion-exchaged or dyed or otherwise colored according to the conventional means. The size of mica-group mineral is optional, though one may frequently employ them in the size range of 0.5 millimeter cube to 1 centimeter cube.

Hydrogen peroxide is usually available on the market as a 35 weight percent aqeous solution and such a solution may be advantageously employed. Alternatively, one may employ, in place of hydrogen peroxide, any substance that will liberate hydrogen peroxide upon contact with water. For example, hydrogen peroxide adducts such as hydrogen peroxide-urea adduct, hydrogen peroxide-phosphate adduct, etc. may also be used in place of hydrogen peroxide. When such hydrogen peroxide adducts are employed, water should be present or be added in the reaction system. The higher the concentration of hydrogen peroxide, the higher is the degree of expansion that will be attained and the shorter is the expansion time required. Thus, the concentration of hydrogen peroxide is not so critical, but, usually, the concentration of hydrogen peroxide in aqueous solutions of hydrogen peroxide is preferably above about 15 weight percent. Therefore, hydrogen peroxide is usually used in the form of an aqueous solution of which concentration is in a range from about 15 to about 35 weight percent.

While the proportion of hydrogen peroxide depends upon the amount of acid used and the desired degree of expansion, it usually ranges from about 0.01 mole to about 1 mole relative to hundred grams of mica-groups minerals.

As mentioned above, water is usually introduced in the reaction system as the carrier or vehicle for an acid and/or hydrogen peroxide, it is preferable that the amount of water relative to the reaction system is in a range from about 3.5 weight percent to about 45 weight percent.

In the above-described manner, mica-group minerals can be successfully expanded. The expansion time varies with different types of acid. When concentrated sulfuric acid (50 to 98 weight percent) is used, the desired expansion takes place within a very short time, usually in about 10 minutes. However, when other mineral acids or organic acids are employed, generally somewhat longer expansion time is required and, in certain instances, the required degree expansion is attained only after as many as about 48 hours.

When the reduction of the expansion time of vermiculite is desired, one may reduce the expansion time to, usually, about 15 minutes or less by adding to the reaction system a small amount of concentrated sulfuric acid or a small amount of mica-group mineral which has been previously heated to about 50° C. to 210° C.; by heating the reaction system to a temperature between about 40° and 100° C.; or by subjecting the system to a high-frequency heating treatment. The small amount of concentrated sulfuric acid ranges usually from about 0.2 to 10 weight percent relative to the mica-group mineral, and the small amount of the previously heated mica-group mineral ranges usually from about 1 to 15 weight percent relative to the mica-group mineral to be expanded.

The high-frequency heating treatment is generally carried out by bombarding the reaction system with electromagnetic irradiation or an infrared irradiation at about a few megacycles to about 4000 megacycles over a period of time of up to 3 minutes at a temperature below 240° C.

The degree of expansion that can be attained by the method of this invention depends upon the amounts of acid and hydrogen peroxide which are to be employed and the origin (or variety) of the mica-group mineral which is to be expanded. Usually, however, mica-group minerals are expanded to about 5 to 15 times their original volumes.

In the following Examples, the part(s) by weight have the same relationship to the part(s) by volume as do gram(s) to milliliter(s). In those Examples, "centimeter(s)," "millimeter(s)" and "percent" are simply abbreviated as "cm.," "mm." and "%," respectively, and "%" is intended to mean "weight percent" unless otherwise noted.

EXAMPLE 1

To 500 parts by weight of vermiculite (about 5 mm. cube) mined by Palabola Mining Co. Ltd., the Republic of South Africa, there is added 25 parts by volume of 98% concentrated sulfuric acid. After the system is thoroughly stirred, 100 parts by volume of 35% aqueous solution of hydrogen peroxide is added, whereupon the mineral expands to 12 times its original volume in 11 minutes.

EXAMPLE 2

To 1000 parts by weight of hydrobiotite (about 5 mm. cube) mined in Onomachi, Fukushima Prefecture, Japan is added 100 parts by vlume of 98% concentrated sulfuric acid. After the system is stirred well, 400 parts by volume of a 17.5% aqueous solution of hydrogen peroxide is promptly added, whereupon the mineral expands to 10,000 parts by volume in 1 minute. As a control, the above procedure is followed with exception of the addition of the concentrated acid, whereupon the mineral expands only to 450 parts by volume.

EXAMPLE 3

To 1000 parts by weight of hydrobiotite (mined in Onomachi, Fukushima Prefecture, Japan) is added 150 parts by volume of 98% phosphoric acid and the mixture is thoroughly stirred. Then, 200 parts by volume of a 35% aqueous solution of hydrogen peroxide is added, followed by further stirring, whereupon the mineral expands 12 times its original volume.

EXAMPLE 4

To 100 parts by weight of Korean vermiculite is added 10 parts by volume of acetic anhydride and, after vigorous stirring, 20 parts by volume of a 35% aqueous solution of hydrogen peroxide is added. The system is heated to 70° C., whereupon the mineral expands to 700 parts by volume. When the same procedure is followed with exception of the addition of acetic anhydride, the mineral expands only to twice its original volume.

EXAMPLE 5

To 50 parts by weight of vermiculite mined in the mainland China (about 7 mm. cube), there are added 2 parts by volume of fuming nitric acid and 3 parts by volume of 98% concentrated sulfuric acid. After the system is stirred well, 15 parts by volume of a 27% aqueous solution of hydrogen peroxide is added, whereupon the mineral expands to 600 parts by volume. When the same amount of said vermiculite is blended with 20 parts by volume of a 35% aqueous solution of hydrogen peroxide and the mixture heated at 80° C., the mineral expands to 450 parts by volume in 20 minutes.

EXAMPLE 6

To 50 parts by weight of muscovite flakes is added 15 parts by volume of 98% concentrated sulfuric acid and, after the system is stirred evenly, 40 parts by volume of a 35% aqueous solution of hydrogen peroxide is added, whereupon the mineral expands to 700 parts by volume.

EXAMPLE 7

A sample of muscovite which has been used in a household iron is cut to 1 cm.$^2$ (0.2 mm. thick), followed by the addition of 2 to 3 drops of 98% concentrated sulfuric acid. The system is allowed to stand for a while and, then, 0.5 part by volume of a 35% aqueous solution of hydrogen peroxide is added, whereupon the mineral expands to 1.2 cm. in thickness.

EXAMPLE 8

To 100 parts by weight of vermiculite mined by Palabola Mining Co. Ltd., the Republic of South Africa, is added 20 parts by weight of benzoic acid, followed by the addition of 10 parts by volume of water. The system is stirred evenly and, then, 25 parts by volume of a 35% aqueous solution of hydrogen peroxide is added. After the system is further stirred well, 3 parts by volume of 98% concentrated sulfuric acid is added, whereupon the mineral promptly expands to 1200 parts by volume.

Substantially similar results are obtained when, in the above procedure, the same amount in moles of each of the following acids is employed.

Naphthenic acid, tartaric acid, oxalic acid, acetic acid, maleic acid, oleic acid, lauric acid, fumaric acid, monochloroacetic acid, myristic acid, malic acid, citric acid, anthranylic acid, stearic acid, capric acid, palmitic acid, lauric acid, lactic acid, gluconic acid, acrylic acid, salicylic acid, orthomethoxybenzoic acid, p-toluenesulfonic acid and uric acid.

EXAMPLE 9

To 100 parts by weight of hydrobiotite mined in Onomachi, Fukushima Prefecture, Japan is added 30 parts by volume of a 10% aqueous solution of silicic acid and, after the system is stirred evenly, 25 parts by volume of a 35% aqueous solution of hydrogen peroxide is added. Thereupon the mineral starts expanding, attaining a volume of 700 parts by volume in 3 minutes.

EXAMPLE 10

To 100 parts by weight of Korean philogopite (about 5 mm. cube) is added 8 parts by volume of 98% concentrated sulfuric acid. The mixture is well stirred and 25 parts by volume of a 35% aqueous solution of hydrogen peroxide is added. The resulting mixture is placed in an electronic range of 2450 mHz. (manufactured by Matsushita Electronic Company Ltd. in Japan). After one minute irradiation, the volume of the philogopite attains to 500 parts by volume. As a control, the above procedure is followed with exception of the addition of concentrated sulfuric acid, whereupon the substantial expansion of the philogopite is not observed but only decomposition of hydrogen peroxide is observed.

EXAMPLE 11

To 100 parts by weight of vermiculite (mined by Palabola Mining Co. Ltd., the Republic of South Africa) is added 5 parts by weight of 98% concentrated sulfuric acid, and the mixture is well stirred followed by the addition of 10 parts by weight of $CO(NH_2)_2 \cdot H_2O_2$. The resulting mixture is placed in an electronic range of 2450 mHz. manufactured by Matsushita Electronic Company Ltd. in Japan. After 3 minutes irradiation, the volume of the expanded vermiculite attains to 12,000 parts by volume.

EXAMPLE 12

To 100 parts by weight of hydrobiotite (mined in Onomachi, Fukushima, Japan) are added 15 parts by volume of a 35% aqueous solution of hydrogen peroxide and 5 parts by volume of an 86% phosphoric acid. The resulting mixture is well stirred and placed in an electronic range of 2450 mHz. manufactured by Matsushita Electronic Company Ltd. in Japan.

After 2 minutes irradiation, the volume of this expanded hydrobiotite is 8 times as that of compared with the original hydrobiotite.

As a control, the above procedure is followed with exception of the addition of the 86% phosphoric acid, and the expansion degree is 4.5 times as that of the original hydrobiotite.

EXAMPLE 13

A mixture is made from 20 parts by volume of a 35% aqueous solution of hydrogen peroxide and 3 parts by weight of 98% sulfuric acid. To 100 parts by weight of hydrobiotite is added the mixture. The resulting mixture is well mixed, and is placed under the infra-red irradiation lamp. After 10 minutes irradiation, the volume of the expanded hydrobiotite is about 8 times as that of the original hydrobiotite.

As a control, the above procedure is followed with exception of the addition of 98% sulfuric acid and the resulting volume is about 4 times as that of the original hydrobiotite.

What is claimed is:

1. A method for expanding a mica-group mineral to at least about 5 times the original volume which comprises treating a mica-group mineral with hydrogen peroxide in the presence of water and an acid, the amount of the acid relative to the mica mineral being in the range from 0.01 to mol to 1 mol relative to 100 grams of the mica mineral and the amount of hydrogen peroxide relative to the mica mineral being in an range from 0.01 mol to 1 mole relative to 100 grams of the mica mineral.

2. A method as claim in claim 1, wherein the acid is a mineral acid.

3. A method as claimed in claim 1, wherein the acid is an organic acid.

4. A method as claimed in claim 2, wherein the mineral acid is sulfuric acid.

5. A method as claimed in claim 2, wherein the mineral acid is phosphoric acid.

6. A method as claimed in claim 2, wherein the mineral acid is nitric acid.

7. A method as claimed in claim 3, wherein the organic acid is acetic acid.

8. A method as claimed in claim 3, wherein the organic acid is benzoic acid.

9. A method according to claim 1 wherein the mica-group mineral is selected from the group consisting of vermiculite, hydrobiotite muscovite, paragonite, phlogopite, biotite, lepidolite, glauconite, chlorite and apophyllite.

10. A method as claimed in claim 1, wherein hydrogen peroxide is used in the form of a hydrogen peroxide aqueous solution of 15 to 35 weight percent.

References Cited
UNITED STATES PATENTS

| | | | |
|---|---|---|---|
| 2,915,477 | 12/1959 | Rotter | 252—378 R |
| 2,492,208 | 12/1949 | Barnes | 252—378 R |
| 2,366,217 | 1/1945 | Ruthruff | 252—378 R |
| 3,459,531 | 8/1969 | Chapin, Jr., et al. | 252—378 R |

DANIELD E. WYMAN, Primary Examiner

P. E. KONOPKA, Assistant Examiner

U.S. Cl. X.R.

106—DIG. 0.003; 204—157.1 R